United States Patent
Kriebel

[11] 3,885,418
[45] May 27, 1975

[54] METHOD AND APPARATUS FOR DETECTING THE PRESENCE OF AN OIL SLICK ON A WATER SURFACE

[76] Inventor: Anthony R. Kriebel, 340 La Mesa Dr., Menlo Park, Calif. 94025

[22] Filed: Oct. 17, 1973

[21] Appl. No.: 407,170

[52] U.S. Cl. .................. 73/61.1 R; 73/59; 340/236
[51] Int. Cl. ........................................ G01n 11/14
[58] Field of Search .................. 73/53, 61.1 R, 59; 340/236

[56] References Cited
FOREIGN PATENTS OR APPLICATIONS
1,020,467 12/1957 Germany .................. 73/61.1 R
1,294,950 4/1962 France ........................ 73/59

Primary Examiner—Jerry W. Myracle
Assistant Examiner—Joseph W. Roskos
Attorney, Agent, or Firm—Lowhurst, Aine & Nolan

[57] ABSTRACT

An oil slick detector comprising a spinner located in a shroud surrounding the spinner and providing a radial gap between the spinner and the shroud, the spinner being driven at a constant speed by a motor, any changes in torque on the motor resulting in changes in the drive current of said motor, the free end of said spinner and shroud being positioned in the water surface such that the water and any oil on the water will enter the radial gap between the spinner and shroud, the torque on the motor being higher in value if oil is present than that torque on the motor if only water is present, said difference in torque resulting in a measurable change in the motor drive current. In a preferred embodiment, the spinner is provided with a spiral groove in its outer surface to encourage the flow of coil and water in the radial gap. By running the spinner first in a forward direction to move oil and water up the spinner and thereafter running the spinner in a reverse direction to move the oil and water off of the spinner, and by measuring the average motor current during the forward and reverse runs, a measurement related to the thickness of the oil slick is obtained.

18 Claims, 8 Drawing Figures

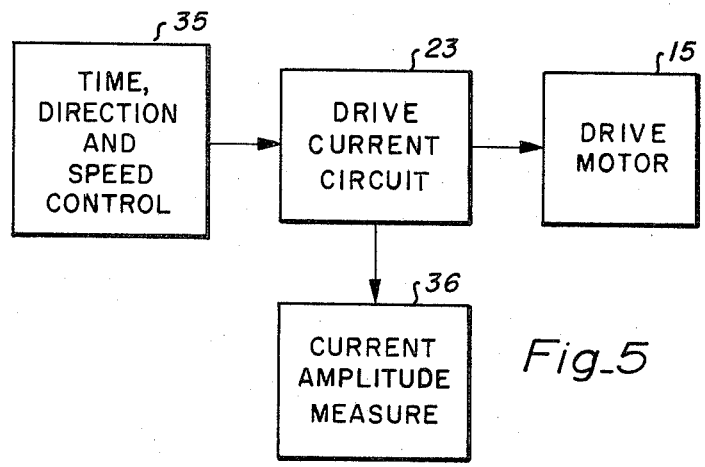
Fig_5
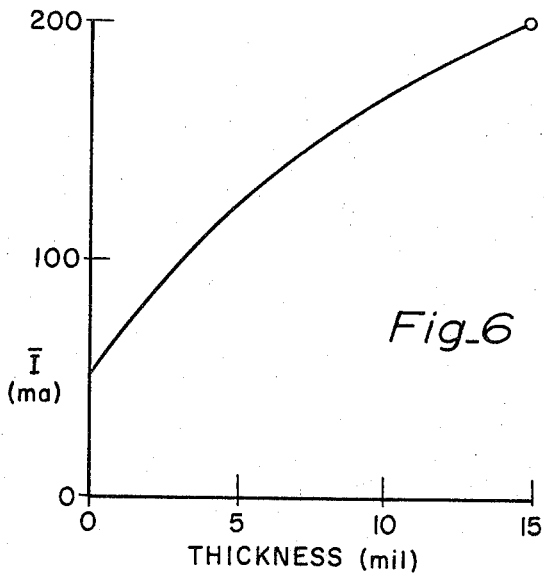
Fig_6
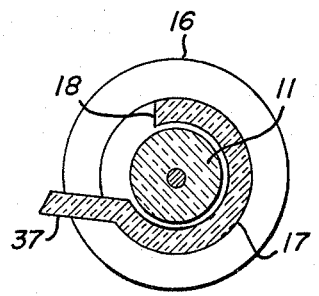
Fig_7
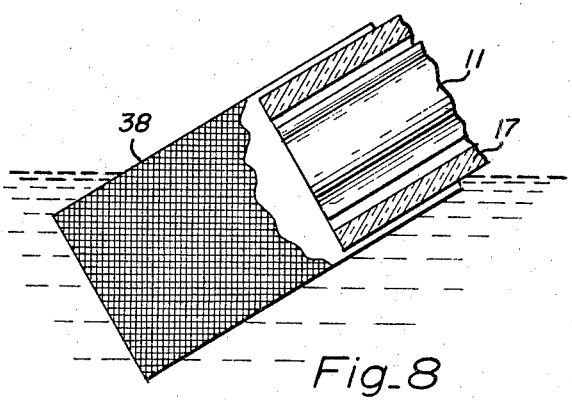
Fig_8

METHOD AND APPARATUS FOR DETECTING THE PRESENCE OF AN OIL SLICK ON A WATER SURFACE

BACKGROUND OF THE INVENTION

The presence of an oil film or slick on a water surface is presently detected by sensing the reflection of microwaves or light off the water surface. This detection may be done remotely, as from an airplane, and the advantages of this airborne remote sensing include rapid response times, rapid coverage of large areas, and the absence of the severe operating conditions associated with detectors floating on the water surface. However, this type of remote sensing is done in periodic manner and is costly. There is a need for an in situ detector which can continuously monitor a number of local critical areas including the effluent from waste water treatment plants, offshore drilling platforms, piers where oil is being transferred to or from tankers, and inlets to congested water facilities or industrial water intakes where a hazard from floating oil exists. Since a large number of such detectors are needed, and since they will be unattended in use for long periods of time, such detectors must be simple and inexpensive, must be reliable, must have long unattended operating times, and must be insensitive to conditions of daylight, atmosphere, or roughness of water surface.

SUMMARY OF THE PRESENT INVENTION

The present invention provides an in situ floating oil film detector which meets the above recited requirements and which comprise a cylinder positioned within a hollow cylindrical enclosure or shroud, the cylinder being driven about its axis at a constant speed by a drive motor. The drive motor may be of the DC type fed from a battery carried with the floating detector, or the DC current supplied to the motor may be obtained from a power supply fed from a standard ac line source. The detector floats on the water in such a manner that the cylinder is partially submerged in the water surface and, in the absence of an oil slick on the water surface, imposes a known and low value of torque on the drive motor due to the drag on the cylinder by the water film between the cylinder and the shroud. When an oil slick appears on the water surface, the surface of the rotating cylinder becomes coated with oil and the torque on the drive motor is increased, increasing the current through the drive motor. This increase in drive motor current is utilized to trigger a control circuit that signals the presence of the oil. For example, the increased current triggers a relay which in turn operates a circuit to transmit a signal to a main station signaling the presence of the oil slick.

In a preferred embodiment of the invention, the rotating cylinder is provided with a spiral groove or thread on its outer surface which helps to move the oil from the water surface up the cylinder to coat the cylinder surface.

A preferred embodiment of the invention also provides a timing control circuit for operating the cylinder in a forward rotary direction for a first fixed period of time to move oil from the water surface and up the surface of the rotating cylinder and for thereafter operating the cylinder in a reverse rotary direction for a second period of time to remove the oil from the cylinder. The average change in motor current is determined over both the forward and reverse drive times, this average current reading providing an indication of the thickness of the oil slick on the water.

BRIEF DESCRIPTION OF THE DRAWINGS

FIG. 5 is a block diagram showing a control system for the oil film detector.

FIG. 6 is a trace showing the relationship between oil film thickness and average motor current for one embodiment of the present invention.

FIG. 7 is a cross section view similar to FIG. 2 showing a different form of oil film detector sleeve.

FIG. 8 is a side view of a portion of the oil film detector with a screen guard in place thereon.

DESCRIPTION OF THE PREFERRED EMBODIMENTS

Figure 1:
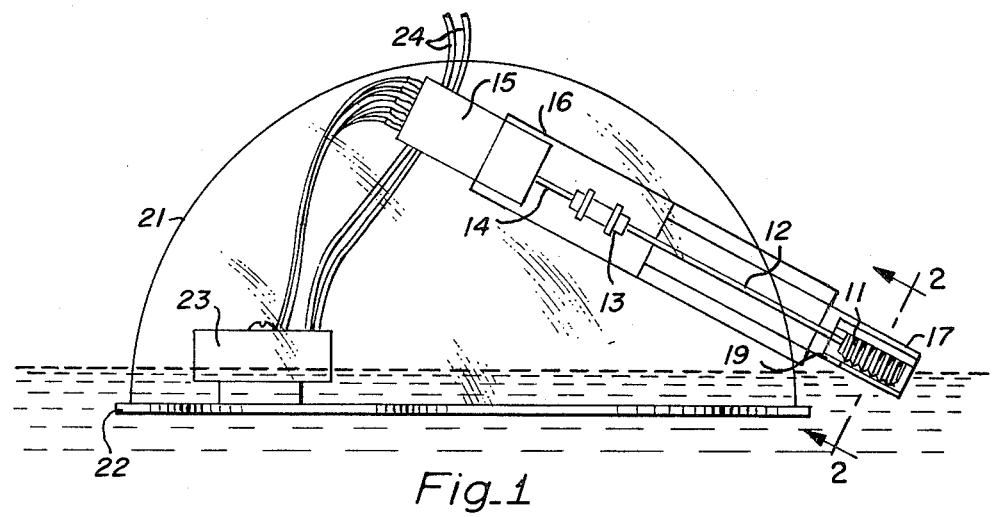
FIG. 1 is a side view of one embodiment of the oil film detector of the present invention mounted in a float.
Figure 2:
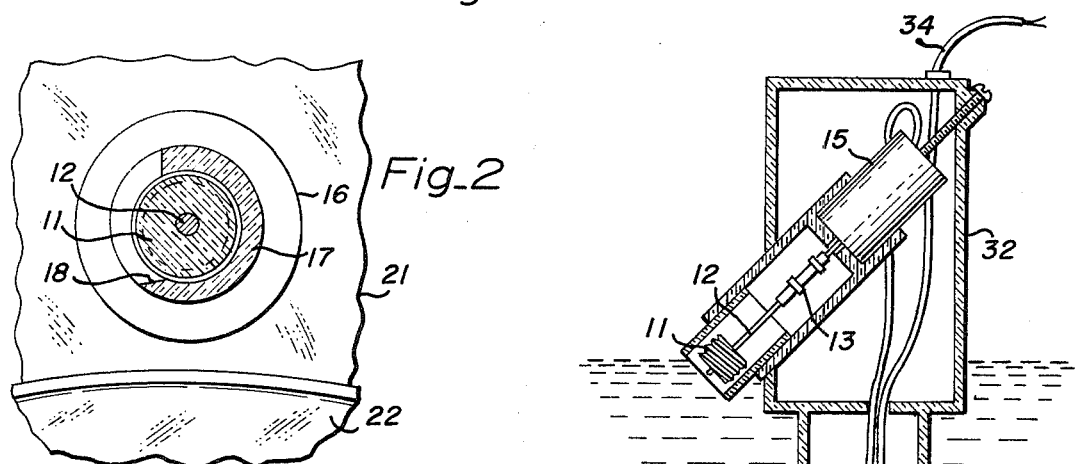
FIG. 2 is a cross section view of the detector of FIG. 1 taken along section line 2—2 in FIG. 1.

Referring now to FIGS. 1 and 2, one preferred embodiment of this invention comprises a cylindrical shaped spinner 11 having an integral drive shaft 12 affixed along the axis of the spinner, the drive shaft 12 being coupled by a flexible coupler 13 to the drive shaft 14 of a drive motor 15. The drive motor 15 is fixedly mounted in the upper end of a first hollow cylindrical sleeve 16, a second hollow cylindrical sleeve or shroud 17 being fixedly mounted in the other end of the sleeve 16. The shroud 17 extends down over the spinner 11 with a small radial gap between the outer surface of the spinner 11 and the inner wall of the shroud 17. The lower open end of the shroud 17 terminates just beyond the lower end of the spinner 11. The spinner 11 and shroud 17 may be made of suitable materials resistant to corrosion in water such as acrylic plastic or stainless steel. One wall section at the lower end of the shroud 17 is cut away to form an opening 18 in the sleeve 17 to provide access for the water and oil onto the surface of the spinner 11. A small opening 19 is provided in the wall of the sleeve 17 at the location of the upper end of the spinner 11 to provide a spill over opening for the fluid from within the sleeve 17.

In one example of a spinner and shroud assembly, the spinner 11 is 0.790 inches long and has a diameter of 0.540 inches and the shroud 17 is about 2.093 inches long with an inner diameter of 0.550 inches and an outer diameter of 0.625 inches.

Figure 3:
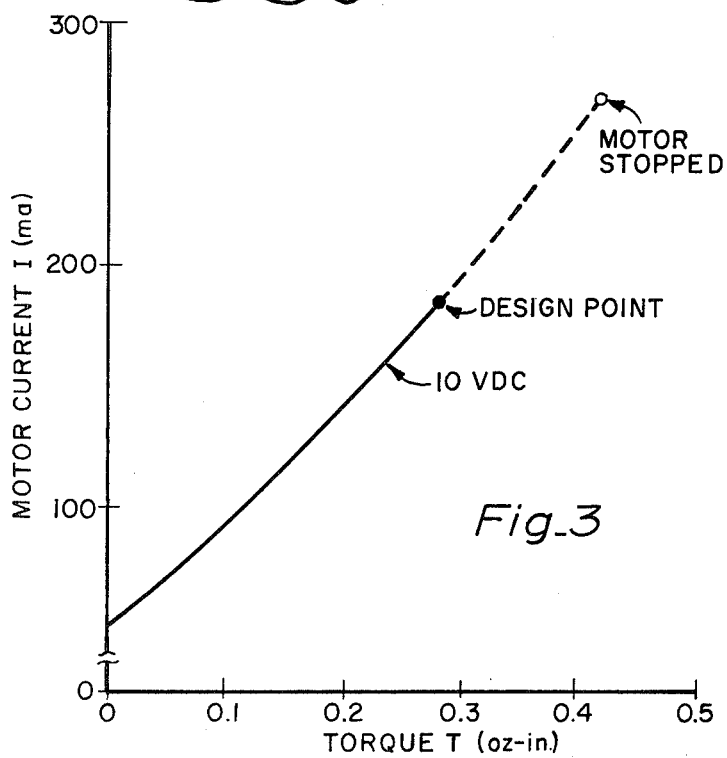
FIG. 3 is a plot of motor torque versus motor drive current for the motor used in the oil film detector of the present invention.

The preferable type of motor drive is the brushless DC motor and control circuit manufactured and sold by Siemens Co. under Model Type 1AD3001 which has good speed regulation, high efficiency, long lifetime, and good sensitivity. This motor operates off of a 10-15 volt source and will operate at practically constant speed until stalled under load. The plot of current drawn by the motor versus torque shown in FIG. 3 illustrates the good sensitivity. It is seen that the motor draws about 50 ma under zero torque, the current increasing almost in linear fashion with increasing torque until, at about a torque of 0.420 and a current of about 270 ma, the motor stalls. Since the motor is brushless, it has a long unattended life, for example 10,000 hours. Also, since the brushless motor does not produce electrical sparks, it is safe for using in hazardous environments.

This oil detector assembly is fixedly mounted on a float comprising a hollow hemisphere 21 sealed on a base plate 22, the detector being mounted within the hollow hemisphere with the spinner end thereof extending out through an opening in the wall of the hemisphere. The detector assembly is mounted with its longitudinal axis at about 45° relative to the plane of the base plate 22, the detector extending out from the float to a point where about one half to three quarters of the end surface of the spinner 11 is submerged below the water surface. The interior of the float is large enough to accommodate the control circuit 23 for the motor drive, electrical leads 24 extending from the float to provide DC current input to the control circuit which is monitored as the motor current related "oil detected" signal output. The motor drives the spinner at a constant speed of about 750 rpm and the surface of the spinner 11 within the shroud becomes covered with water when water surface is free of an oil slick, and covered with water and oil when an oil slick appears on the water surface.

The torque on a cylinder spinning inside an enclosure with a thin radial gap filled with a viscous fluid in shear can be readily predicted ideally as follows:

The shaft torque T is given By $$T = 2\pi RL \, (Rs)$$

where $R$ is the radius of the spinner, $L$ is the length of the spinner, and $s$ is the shear stress.

Now $$s = \omega R\mu / (gX)$$

where R is the spinner radius in feet, X is the radial gap between the spinner and shroud in feet, $\mu$ is the fluid viscosity in lb/sec.-ft., and g is the gravitational constant, 32.2 ft/sec.².

Upon substitution $T = 2\pi R^3 L\omega\mu/gX$
$= 2 ALV\mu/gX$
$= S\mu/g$ where
$A = \pi R^2 =$ spinner face area (ft²)
$V = \omega R =$ spinner tip speed (fps)
$\mu/g =$ fluid viscosity (lb-sec/ft²)
$S = 2AVL/X =$ sensitivity coefficient (ft³/sec)

The equation $T = S\mu/g$ is only a rough approximation because the calculated value neglects spinner end effects, non-uniform oil coverage of the spinner, the spinner weight, turbulence in the lubricant, oil viscoisity variations from heating, and boundry layer effects for slotted shrouds. However, when operating in SAE 10 oil with $\mu = 100$ and in Southern California crude oil with $\mu = 170$, the actual measured values of torque were generally at least half as large as the calculated value, In one method of operation of the detector, the spinner is operated continuously and at a constant speed, for example 750 rpm. So long as the spinner is submerged only in water, the torque on the motor, and thus the motor current, will be on the low side of the scale of FIG. 3. When oil appears on the water surface, the torque on the motor, and thus the motor current, increases. When the motor current reaches a preselected value, for example 120 ma, a relay or other known form of trigger circuit associated with the control circuitry 23 is operated to signal the presence of the oil. Given such a trigger signal, many forms of alerting or recording techniques may be employed to make an observer aware of the oil slick condition.

In another method of operation, the drive motor is controlled from a timing circuit incorporated in the control circuitry so that the spinner will be activated only intermittently, for example ten seconds on and twenty seconds off. This conserves power and, at the same time, will permit the water and oil to drain off the spinner while the spinner is stationary which improves the detectability of the oil slick.

The preferred mode of operation of this oil detector is with the end of the spinner only slightly submerged in the water surface. Detector performance is not as good with deep submergence for the reason that the amount of oil retained in the clearance gap, and thus the drive motor current, decreases when the submergence is increased. Mainly for this reason longer cylinders or spinners, for example 0.79 inches long, are preferred to shorter cylinders, for example 0.20 inches. However, for some applications shorter spinners are acceptable.

Also, although satisfactory operation is obtained with smooth walled spinners, the results are enhanced when the wall is provided with a spiral groove as shown in FIG. 1. The spiral groove in the spinner encourages the oil film to spread upward over the spinner surface and into the gap during the forward running of the motor and spinner. A preferred spiral groove was found to be 24 per inch and 7 mils deep.

Figure 4:
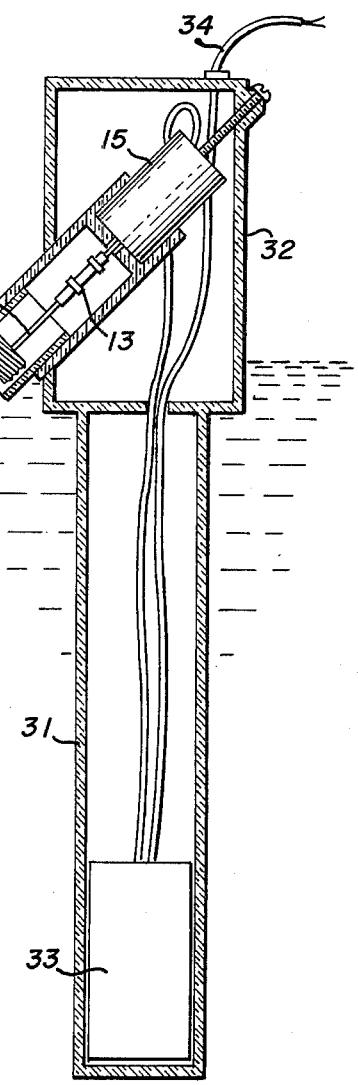
FIG. 4 is a side view of a second embodiment of the oil detector of the present invention.

Another embodiment of the present invention is shown in FIG. 4 wherein the float comprises a lower ballast hollow cylinder 31 and an upper hollow cylinder 32 in which the detector apparatus and drive motor 15 are located. The lower cylinder 31 carries the DC battery 33 used to drive the motor as well as the control circuitry (not shown) for controlling the on time and off time of the motor. The oil detected output warning signal is transmitted from the float via the cable 34.

It should be understood that the oil detector need not be mounted on a float which rides up and down on the waves of the water surface. Where for example, the water level is very nearly constant, the oil detector may be fixedly mounted to a pier or the like. When mounted on a float device, the oil detector successfully operates even with a ± 2 inch bounce amplitude, i.e. the water level relative to the detector level, resulting when much higher peak to peak waves occur.

While it is most desireous to detect the presence of an oil slick, it is often desirable that an indication be given of the thickness of the slick. For this purpose, a simple form of timer circuitry 35 is (FIG. 5) incorporated to drive the motor 15 first in a forward direction for a fixed period of time at a relatively slow speed and thereafter in a reverse direction for a second fixed period of time at a relatively fast speed. For example, the forward drive time may be 10 seconds at a speed of 750 rpm and the reverse drive time may be 30 seconds at a speed of 3,500 rpm. During the forward drive time the water and oil mix is transported up the spinner and into the gap between the spinner and sleeve. During the reverse direction time, the water and oil are expelled from the gap. The average motor current over the forward and reverse drive times is measured by current measuring circuit 36, and this average current is directly proportional to the thickness of the oil film for a given oil viscosity, as illustrated by the curve of FIG. 6 which shows average motor current along the ordinate and oil film thickness along the abscissa.

An improved form of spinner sleeve is illustrated in the end view of FIG. 7, the sleeve being provided with a wall section folded out form the cylindrical wall surface to form a tangentially extending guide wall at the opening 18 which, in use, tends to direct the flow of oil and water onto the spinner 11.

In still another embodiment of the invention, the sleeve 17 is provided with a cylindrical mesh screen extending from the end of the sleeve into the water surface. The screen is utilized to shield the oil detector from debris that may be floating on the surface of the water. A 45 mil screen is a proper choice since it is small enough to filter out most of the troublesome size debris while permitting all but the most viscous type oil to penetrate to the spinner.

What is claimed is:

1. Apparatus for sensing the presence of an oil slick on the surface of a body of water comprising
   a cylindrical spinner;
   a hollow cylindrical shroud partially enveloping said spinner and providing a radial gap between the inner surface thereof and the surface of the spinner, said shroud having an opening therein adjacent said spinner to permit the passage of water and oil to the spinner, said shroud and spinner adapted to be positioned such that the opening in said shroud and said spinner are partially submerged in the surface of the water;
   a drive motor for spinning said spinner in said shroud, the torque on said motor being of one value with the water surface free of oil and being of a different value with an oil slick present on the water surface, and
   means for detecting the difference in the torque on said motor.

2. Apparatus as claimed in claim 1 including a float adapted to float on the surface of the water, said detector being mounted on said float and extending toward the water surface with the opening in said shroud and said spinner partially submerged in the water surface.

3. Apparatus as claimed in claim 2 wherein said detector is mounted on said float such that said detector extends into the water surface with the axis of said spinner at an angle to the surface of the water.

4. Apparatus as claimed in claim 3 wherein said spinner is provided with a spiral groove in its surface, said groove extending up the spinner surface from the end submerged in the water surface, said groove aiding the movement of water and oil up the spinner surface during rotation of the spinner in the forward direction.

5. Apparatus as claimed in claim 4 including means for driving said drive motor and spinner in a forward direction to move said water and oil up the spinner surface via said groove, and means for thereafter driving said drive motor and spinner in a reverse direction to move said water and oil down off the spinner via said groove.

6. Apparatus as claimed in claim 4 wherein said means for detecting the difference in the torque on said motor comprises means for detecting the driving current through said motor.

7. Apparatus as claimed in claim 4 wherein said shroud includes a guide wall extending tangentially outwardly therefrom for guiding water and oil onto the spinner.

8. Apparatus as claimed in claim 1 wherein said spinner is provided with a spiral groove in its surface, said groove extending up the spinner surface from the submerged in the water surface, said groove aiding the movement of water and oil up the spinner surface during rotation of the spinner in the forward direction.

9. Apparatus as claimed in claim 8 including means for driving said drive motor and spinner in a forward direction to move said water and oil up the spinner surface via said groove; and means for thereafter driving said drive motor and spinner in a reverse direction to move said water and oil down off the spinner via said groove.

10. Apparatus as claimed in claim 8 wherein said means for detecting the difference in the torque on said motor comprises means for detecting the level of the driving current through said motor.

11. Apparatus as claimed in claim 1 wherein said means for detecting the difference in the torque on said motor comprises means for detecting the driving current through said motor.

12. Apparatus as claimed in claim 1 wherein said shroud includes a guide wall extending tangentially outwardly therefrom for guiding water and oil onto the spinner.

13. The method for sensing the presence of an oil slick on the surface of a body of water comprising the steps of
   positioning a cylindrical spinner within a hollow cylindrical shroud enveloping said spinner whereby a radial gap is formed between the inner surface of the shroud and the surface of the spinner, said spinner being located adjacent an opening in said shroud, said shroud and spinner being positioned such that the opening and said spinner are partially submerged in the surface of the water;
   driving said spinner with a drive motor, the torque on said motor being of one value with the water surface free of oil and being of a different value with an oil slick present on the water surface, and
   detecting the difference in the torque on said motor.

14. The method as claimed in claim 13 including the step of floating said detector on the surface of the water, said detector floating with the opening in said shroud and said spinner partially submerged in the water surface.

15. The method as claimed in claim 14 wherein said detector floats on the water surface such that said detector extends into the water surface with the axis of said spinner at an angle to the surface of the water.

16. The method as claimed in claim 13 wherein said step of detecting the difference in the torque on said motor comprises the step of detecting the level of the driving current through said motor.

17. The method as claimed in claim 13 wherein a spiral groove is provided in the spinner surface extending from the end submerged in the water surface, said groove aiding the movement of water and oil up the spinner surface during rotation of the spinner.

18. The method as claimed in claim 17 including the steps of driving said motor and spinner in a forward direction to move said water and oil up the spinner surface via said groove, and thereafter driving said drive motor and spinner in a reverse direction to move said water and oil down off the spinner via said groove.

* * * * *